United States Patent [19]
Zaretsky

[11] Patent Number: 5,617,288
[45] Date of Patent: Apr. 1, 1997

[54] AUTOMATIC SURGE SUPPRESSOR DISCONNECT PROTECTION SYSTEM

[75] Inventor: Albert Zaretsky, Brooklyn, N.Y.

[73] Assignee: Leviton Manufacturing Co., In., Little Neck, N.Y.

[21] Appl. No.: 465,663

[22] Filed: Jun. 5, 1995

[51] Int. Cl.$^6$ .................................................. H02H 1/00
[52] U.S. Cl. ............................................. 361/127; 361/91
[58] Field of Search ............................... 361/127, 119, 361/103, 91, 42, 15, 17, 16

[56] References Cited

U.S. PATENT DOCUMENTS

| | | | |
|---|---|---|---|
| 4,174,529 | 11/1979 | Hamann | 361/16 |
| 4,636,910 | 1/1987 | Chadwick | 361/103 |

Primary Examiner—Jeffrey A. Gaffin
Assistant Examiner—Sally Medley
Attorney, Agent, or Firm—Paul J. Sutton

[57] ABSTRACT

A surge suppressor disconnect protection circuit is coupled to a first surge suppressor electrically coupled to the terminals of an AC source to protect the first surge suppressor from predetermined overvoltages. The circuit includes a relay switch connected in series with the first surge connected to the AC source terminals for rectifying the AC to generate a DC signal. The adjuster filters the DC signal and scales the filtered DC signal. An amplifier is electrically coupled to the adjuster and to and providing a difference signal integrator time constant is electrically connected to the amplifier and produces a signal which is proportional to a length of time the scaled DC signal is greater than the first voltage reference. A comparator is connected to a second voltage reference. The comparator output is electrically coupled to the relay switch which opens the switch contact to set it to a high impedance state when the integrator output signal exceeds the second voltage reference.

21 Claims, 1 Drawing Sheet

AUTOMATIC SURGE SUPPRESSOR DISCONNECT PROTECTION SYSTEM

BACKGROUND OF THE INVENTION

Most semiconductor devices are intolerant of excessive voltage; destructive breakdown or damage can occur in semiconductor devices when subjected to transient overvoltages that persist for only a few microseconds. Transient Voltage Surge Suppression (TVSS) devices, referred to interchangeably herein as surge suppressors and voltage-clamping devices, are commonly known for use in suppressing such overvoltage transients to protect voltage-surge intolerant circuitry. TVSS devices commonly include non-linear, voltage-dependent resistive elements which display electrical behavior similar to that displayed by a pair of series-connected, back-to-back zener diodes. At normal voltages, below the TVSS clamping voltage level, TVSS devices display a high resistance with a small leakage current. When subjected to large transient voltages (above the TVSS device's clamping voltage), the TVSS device is forced by its characteristics to operate in a low resistance region which increases current flow through the device. The increased current produces an increased voltage drop across the source impedance, effectively clamping the transient voltage to a level determined acceptable (i.e., safe) for the protected circuit. The potentially destructive surge energy is thereby dissipated or passed through the voltage-clamping (TVSS) device and its operating current returns to its normal range after the surge.

Avalanche diode suppressors, metal oxide varistors (MOVs) and selenium surge suppressors may be utilized as TVSS devices with varying advantages and disadvantages, such as an MOV-based TVSS's inherently susceptibility to failure under certain conditions. More specifically, MOV components have a tendency to explode when overheated, often with sufficient explosive power to fracture plastic housings and sheet metal enclosures within which they reside. The explosion usually completely destroys everything within the TVSS housing and may possibly shoot hot black powder through any small openings in the housing. Various techniques have developed to protect MOVs from the causative factors leading to such explosive conditions.

One technique for protecting metal oxide varistors (MOVs) requires adding a current fuse in series with the MOV, which trips to an open state to protect the MOV when particular transient overvoltages are detected. Transients with $I^2t$ ratings that are greater than the fuse rating, but just below the MOV rating will blow the fuse, electrically removing the MOV from the overvoltage condition. Under circumstances where the fuse displays an $I^2t$ rating such that commonly occurring transients are insufficient to blow the fuse, i.e., from a few to 10,000 amperes, but of insufficient magnitude to force the MOV to its low impedance state, the MOV is subjected to overheating, possibly leading to thermal runaway. Steady state, abnormal overvoltage conditions below those at which the fuse will blow may also generate sufficiently high currents through the MOV leading to dangerous overheating.

A second common technique for protecting MOVs from overheating due to abnormal steady state or transient overvoltage conditions utilizes a thermal cutoff device (TCO) provided electrically in series with the MOV. TCOs sense the surface temperature of the MOV and trip to a high impedance state (open circuit) at a particular maximum rated temperature, cutting off voltage to the MOV. Thermal cutoff devices, however, like current fuses are not without problems when used within MOV-protected circuits. In particular, it is extremely difficult, and sometimes impossible to achieve good thermal contact between a surface of the MOV and a thermal cutoff device. Consequently, the MOV may overheat to a point of thermal runaway before the critical temperature is detected and the overvoltage is cut-off from the MOV by the TCO. Further, mismatch problems may also occur between the time constant of the thermal cutoff (i.e., time to blow) and heating/time characteristics of the MOV even when good temperature detection is possible, rendering accurate MOV protection unreliable. And in addition, both current fuses and temperature cut offs are permanently opened so that although explosions may be prevented, the transient voltage surge suppressor function is permanently lost.

It would therefore be desirable to have available an MOV overvoltage protection circuit which is effective in reliably cutting off voltage to the MOV to prevent damaging overheating in the MOV, after which the MOV is connected back into the circuit. Preferably, the MOV protection circuit would effectively protect the MOV whether the overvoltage conditions are continuous or temporary (i.e., transients). It would also be desirable to have available an MOV overvoltage protection circuit which cuts off voltage across the MOV in accordance with a length of time for which the MOV is subjected to a specific overvoltage level, and the MOV's thermal time constant. After a time period defined according thereto is run, the protection circuit would disconnect the MOV from the AC source. The time of cutoff would theoretically be just prior to the point in time at which the MOV would have failed. When the temperature of the MOV is detected to be at a safe MOV operating level, the MOV would be coupled back into the circuit thereby minimizing a time in which the MOV is electrically removed from the circuit it was meant to protect.

BRIEF SUMMARY OF THE INVENTION

A surge suppressor protection circuit for automatically electrically disconnecting a surge suppressor electrically coupled between a phase and a neutral port of a circuit protected by the surge suppressor (i.e., a load circuit) at the occurrence of a predetermined overvoltage condition. Both the protection circuit and the protected load circuit are parallel connected to an AC source. The protection circuit includes means for disconnecting the surge suppressor from its path to the AC source; preferably a relay switch containing a relay contact and relay drive means. The relay contact is electrically interposed between the load circuit phase port and the surge suppressor and is positionable to one of a high and a low impedance state; the high impedance state (i.e., open circuit) effectively isolates the surge suppressor from the AC source. The relay drive means is electrically connected between the surge suppressor and the load circuit phase port. Also included in the circuit is a signal adjuster with a phase port, a neutral port, and a DC port. The adjuster is electrically connected at its phase port to the load circuit phase port and at its neutral port to the load circuit neutral port (in parallel with the suppressor/contact series combination) for rectifying an AC signal provided by the AC source. The adjuster then filters the rectified DC, and scales the rectified DC to form a scaled DC signal, which is proportional to the AC source.

The circuit also includes an amplifier with both an inverting and non-inverting input port, and an amplifier output port which is electrically coupled to the inverting input port as a feedback path. The inverting input port is also connected to a first voltage reference which is proportional to a maximum rated voltage of the surge suppressor. The non-inverting input port is electrically coupled to the signal adjuster supply port. The amplifier generates a difference signal proportional to a difference between the scaled DC signal and the first voltage reference. The difference signal is positive when the scaled DC signal is greater than the first voltage reference; the difference signal is negative when the scaled DC signal is less than the first voltage reference.

The amplifier output is coupled to an integrator circuit. The integrator circuit, in combination with the amplifier and a comparator circuit, act essentially as a timer to track the overvoltage and the length of time of which the overvoltage (to which the scaled DC voltage signal is proportional) exceeds the level of the first voltage reference. The comparator circuit is electrically connected at its non-inverting input to the integrator output, and at its inverting input to a second voltage reference. Accordingly, a signal output from the integrator is constantly compared with the second voltage reference and generates a control signal based thereon. The relay driver is electrically responsive to the comparator output (control signal) for defining the state of the relay contact thereby controlling the voltage across the surge suppressor. Preferably, a low-current second surge suppressor is electrically connected between the amplifier means and the integrator for proportionally adjusting an amplitude of the amplifier means output signal. The second suppressor provides nonlinear voltage, current and thermal characteristics representative of those of the first suppressor, rendering protection of the first suppressor more reliable.

Accordingly, the automatic surge suppressor disconnect protection system of this invention provides an effective device for protecting a surge suppressor (e.g., MOV) that is subjected to steady state or transient voltages that are high enough to cause overheating within the surge suppressor device, but not high enough to trip an in-line fuse associated with the device to a high impedance state. In addition, the surge suppressor protection is provided in such a way that the surge suppressor is not disconnected from the circuit unless it has been driven to a point just below its point of breakdown, minimizing the time in which the device is electrically removed from the circuit and therefore not available to perform its function of protecting the load circuitry from overvoltage conditions.

DETAILED DESCRIPTION OF THE INVENTION

Figure 1:
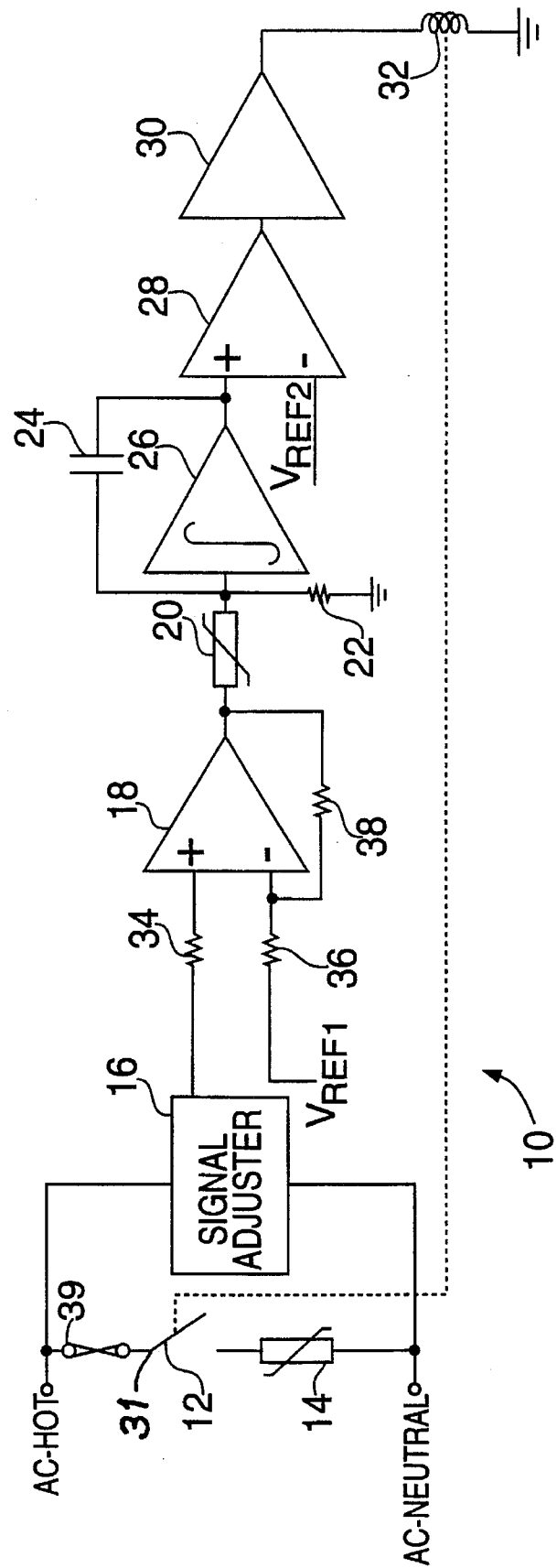
FIG. 1 is a schematic diagram of a preferred embodiment of the automatic surge suppressor disconnect protection system of this invention.

As described above, various techniques are known for protecting surge suppression devices, e.g., metal oxide semiconductors (MOVs), from abnormal power line overvoltage conditions which may cause overheating and/or damage in the device. For example, high continuous line voltages which are high enough to cause overheating in the surge suppression device, but not high enough to push the surge suppressor into a low impedance state (i.e., a surge suppression state), can cause overheating and possible damage to the surge suppressor. High line voltages commonly result from open neutral fault conditions which may cause high currents to flow through the surge suppression device.

In-line fuses and thermal cutoff devices tend to provide inaccurate surge suppressor protection. Because surge suppressors may be temperature correlated with varying overvoltage conditions, a definitive surge suppression device temperature rise can be estimated from the time at which the surge suppressor is subjected to an overvoltage condition.

By coordinating surge suppressor voltage, times for which the surge suppressor is subjected to such voltages, and the surge suppressor temperature characteristics, an ideal time can be calculated for disconnecting the surge suppressor from the AC power source just prior to that point at which damage will result from the overvoltage. In a case where the surge suppressor in implemented with a metal oxide varistor (MOV), thermal time constants may be determined by measurement of MOV device voltage/temperature characteristics, or may be supplied by an MOV manufacturer in a form of thermal gradient data relating MOV temperature to overvoltage and time. Accordingly, an automatic surge suppressor disconnect protection system presented herein will be described particularly with reference to an MOV surge suppressor or disconnect protection system 10, as shown in FIG. 1, preferably for use with GFCI circuits. The MOV-based description of the invention, however, is for illustration purposes only, and is not meant to limit the scope of the invention.

Surge protection system 10 includes AC-HOT and AC-NEUTRAL ports which are electrically connectable to a protected circuit's, i.e., a load circuit, phase and neutral ports. The load circuit phase and neutral ports are typically connected directly to phase and neutral lines of an AC source. The AC-HOT and AC-NEUTRAL ports are also electrically coupled to phase and neutral ports, respectively, of a signal adjuster 16. A series combination of relay contact 12, of a relay switch 31, and a first metal oxide varistor (MOV) 14 and a current fuse 39 are shunted across the signal adjuster 16 to ports AC-HOT and AC-NEUTRAL, receptively. An output port of signal adjuster 16 is electrically connected, preferably through a resistor 34, to a non-inverting input port of an op amp 18. An inverting input port of op amp 18 is electrically connected to a first reference voltage, $V_{REF1}$, via resistor 36. An output of the op amp 18 is electrically coupled to an integrating op amp 26, as well as to the inverting input of op amp 18 through a resistor 38 in order to supply feedback thereto.

In the preferred embodiment, the op amp 18 output is coupled into the integrating op amp 26 through a second MOV 20. An output of integrating op amp 26 is provided to a non-inverting input of a comparator 28, and back to its input port with an electrical feedback path formed through a capacitor 24. A resistor 22 is also electrically connected between the integrating op amp 26 input and ground, together with the capacitor 24 defining an integration time constant. The integrator formed thereby defines an output signal which is proportional to both the overvoltage and time it is applied as the scaled DC signal (which is proportional to the overvoltage). An inverting input of comparator 28 is electrically connected to a second reference voltage, $V_{REF2}$. The comparator 28 output is electrically coupled to relay coil 32 of relay switch 31, preferably through a buffer amplifier 30. When the integrating op amp 26 output signal overcomes the second voltage signal, $V_{REF2}$, a signal is generated (i.e., the comparator output) which actuates the relay coil 32 causing the relay contact 12 to trip and electrically disconnect the first MOV 14 from the overvoltage condition.

The time period defined by the integrating op amp 26 comparator 28 combination is substantially proportional to a time in which the amount of overvoltage would theoretically cause the first MOV 14 to go into a thermal runaway heat condition. So, if the suppressor system 10 detects an overvoltage condition present at the MOV, it anticipates the critical time at which a MOV suppressor may be subjected to the detected overvoltage before being damaged. The invention actually tracks the time the MOV is subjected to the overvoltage, adjusting the integrating op and 26 output both up and down as the overvoltage varies overtime.

The anticipated cutoff time, which is dependent on the integration time constant, is calculated in accordance with the first MOV's thermal time constant at the particular overvoltage. The second MOV 20 surge suppressor utilized herein is preferably that of a low voltage type in order to control the input impedance of the source as seen by the integrating op and 26 and therefore provide a non-linear time constant similar to the MOV non-linearity. Accordingly, the integrating op and 26 is able to replicate both the thermal and the voltage/current nonlinearity characteristics of the MOV to be protected and disconnect the MOV 14 from the AC source, if necessary, without damage to the device. When the voltage returns to normal, the first MOV 14 is automatically switched back into the circuit, accurately preventing unnecessary or erroneous MOV disconnect time.

Detailed operation is as follows. Current fuse 39 prevents MOV 14 explosions for microsecond kiloamp transients which are too short in time for relay contact 12 to open. Signal adjuster 16 rectifies AC line voltage present at terminals AC-HOT and AC-NEUTRAL (i.e., transient or steady state overvoltages). Substantially all 60 Hz ripple is filtered from the rectified (DC) signal therein. In addition, signal adjuster 16 scales the filtered DC signal to an appropriate level for the subsequent amplifier stage (op amp 18). The op amp 18 output voltage signal is equal to a positive or negative difference between the scaled DC signal and $V_{REF1}$. $V_{REF1}$, therefore, is defined as the maximum voltage which the first MOV 14 may be subjected without protection, i.e., at voltages above $V_{REF1}$ damage may occur to the first MOV 14 after a certain time.

The integrating op amp 26 output is dependent upon the magnitude of its input, i.e., the output of op amp 18. If the op amp 18 output (i.e., the difference between the scale DC output representing the overvoltage and $V_{REF1}$) is positive, the integrating op amp 26 output is increasing. In other words, when the DC signal exceeds the level of $V_{REF1}$, the integrating op amp 26 starts tracking the time of the overvoltage. If the increase in the difference between the scaled DC signal increases, the integrating op amp 26 makes note of the increase and the time at which the first MOV 14 is subjected to the increase. However, if the scaled DC signal drops below $V_{REF1}$, the op amp 18 output goes negative in proportion to the difference. This effects the level of the integrating op and 26 output, lowering it at a rate which is dependent on the input. Depending on the level of the op amp 18 output, which drives the integrating op amp 26, comparator 28 will determine when it is time to remove the overvoltage at the first MOV 14. In other words, the time at which the integrating op amp 26 output exceeds $V_{REF2}$, the comparator 28 outputs an interrupt signal to the relay coil 32 which trips relay switch 31 which opens the contact 12. This "cutoff" time corresponds to both the overvoltage level and the time of which the circuit is subjected to the overvoltage. When the signal output from the integrating op amp 18, in accordance with $V_{REF1}$, drops below $V_{REF2}$, the comparator 28 output changes, which allows relay coil 32 to operate relay switch 31 and allow the relay contact 12 to close and return to a low impedance state.

The embodiment of the invention disclosed in the present specification, drawings and claims are presented merely as an example of the invention. Other embodiments, forms, or modifications thereof will readily suggest themselves and are contemplated as coming within the scope of the present invention, which is defined by the following claims.

What is claimed is:

1. A surge suppressor disconnect protection circuit for protecting a first surge suppressor from overvoltages, said first surge suppressor electrically coupled between phase and neutral terminals which electrically connect to an AC source, said protection circuit comprising:

switching means including a contact setable to one of a high and a low impedance state in accordance with an interrupt signal, said switching means electrically connected between said first surge suppressor and one of said terminals;

signal adjuster means electrically connected between said phase and neutral terminals for rectifying AC from said AC source to generate a DC signal, filtering and scaling said DC signal;

amplifier means electrically coupled to said adjuster means at a non-inverting input port, at an inverting input to a first voltage reference and at an output port back to its inverting input port, wherein a difference signal indicative of a difference between said first reference signal and said DC signal is provided at said output port;

integrator means electrically coupled to said amplifier means for generating a timer signal a magnitude of which is proportional to a magnitude of said difference signal and a time said difference signal is defined at said magnitude; and comparing means for comparing said timer signal to a second reference signal and generating said interrupt signal based thereon.

2. The protection circuit defined according to claim 1, further including current fusing means electrically connected in series to said first surge suppressor for protecting said suppressor from transients within a kiloamp/microsecond range.

3. The protection circuit defined according to claim 1, wherein said difference is proportional to a difference between said overvoltage and a maximum voltage of which said first surge suppressor may be subjected without sustaining permanent damage.

4. The protection circuit defined according to claim 3, wherein said first reference signal is substantially proportional to an overvoltage which is less than a maximum rated voltage of said first surge suppressor but large enough to cause substantial heating within said first surge suppressor.

5. The protection circuit defined according to claim 1, wherein said interrupt signal is generated just prior to a predetermined time at which said first surge suppressor would suffer heat damage when subjected to overheating pursuant from said overvoltage.

6. The protection circuit defined by claim 1, wherein said difference is positive when said DC signal is greater than said first reference signal and negative when said DC signal is less than said first reference signal.

7. The protection circuit defined by claim 1, further including a second surge suppressor electrically interposed between said amplifier output port and said integrator means.

8. The protection circuit as defined by claim 7, wherein said second surge suppressor simulates nonlinear voltage, current and thermal characteristics representative of said first surge suppressor such that a non-linear time constant is imparted to said integrator means.

9. The protection circuit defined by claim 8, wherein said second surge suppressor is a metal oxide varistor.

10. The protection circuit defined by claim 9, wherein said second metal oxide varistor is a low-power and low-voltage metal oxide varistor.

11. The protection circuit defined by claim 1, wherein said integrator means includes a resistor connected between an integrator input port and ground and a capacitor connected between said input port and an output port.

12. The protection circuit defined by claim 1, further including a buffer amplifier interposed between said comparing means and a first end of a relay coil, said relay coil for placing said switching means into said high impedance state.

13. The protection circuit defined by claim 1, wherein said first surge suppressor is a metal oxide semiconductor varistor (MOV).

14. The protection circuit defined by claim 1, wherein said phase and neutral terminals are electrically connected to a circuit protected by said first surge suppressor.

15. The protection circuit according to claim 1, wherein said switching means returns to said high impedance state when said overvoltages are no longer present between said phase and neutral terminals.

16. A method for protecting a surge suppresser device from predetermined overvoltage conditions, said surge suppresser device connected across a phase and a neutral of an AC source, said method comprising the steps of:
- determining a critical voltage at which said surge suppressor device will sustain damage;
- determining a critical time for which said surge suppressor device may be subjected to said critical voltage without sustaining damage;
- determining whether an overvoltage applied to said surge suppressor device exceeds said critical voltage;
- developing a signal derived from said overvoltage and subsequently subject to a non-linearity proportional to the non-linear characteristics of said surge suppressor device;
- integrating said signal over time; and
- disconnecting said surge suppressor device from said AC source when said integrated signal exceeds a predetermined threshold.

17. A ground fault circuit interrupter system including surge suppressor protection comprising:
- a ground fault circuit interrupter electrically connected to phase and neutral terminals of an AC source;
- a first surge suppressor electrically coupled to said phase and neutral terminals, respectively, for protecting said ground fault circuit interrupter from predetermined overvoltages; and
- a surge suppressor disconnect protection circuit electrically coupled to said first surge suppressor and said phase and neutral terminals for protecting said surge suppressor from said predetermined overvoltages by disconnecting said first surge suppressor from said AC source under predetermined conditions, said surge suppressor disconnect protection circuit comprising:
  - a relay switch including a relay contact and a relay drive coil each having first and second ends, wherein said relay contact is settable to one of a high and a low impedance state in accordance with a disconnect signal and wherein said contact is electrically connected at said first end to a first end of said surge suppressor and at said second end to one of said phase and neutral terminals;
  - signal adjuster means including phase, neutral and DC ports, wherein said phase port is electrically connected to said phase terminal and said neutral port is electrically connected to said neutral terminal and wherein said adjuster means rectifies AC present at said phase and neutral ports to generate a DC signal, filters and scales said DC signal and provides said scaled DC signal at said DC port;
  - amplifier means including an inverting input port, a non-inverting input port, and an amplifier output port, wherein said non-inverting input port is electrically coupled to said signal adjuster DC port, said inverting input port is electrically coupled to a first voltage reference signal and said amplifier means output port is electrically coupled to said inverting input port to provide a feedback path therebetween such that a difference signal equal to a difference between a first voltage reference signal and said scaled DC is provided at said amplifier output port;
  - an integrator having an input port and an output port, said integrator input port electrically coupled to said amplifier output port wherein said integrator generates a time-out signal at said integrator output port which is proportional to said difference signal and a time at which said difference signal is present; and
  - a comparator having a non-inverting input port, an inverting input port and an output port, said non-inverting comparator input port electrically connected at said non-inverting input port to said integrator output port, said integrator inverting input port electrically connected to a second voltage reference signal and said integrator output port electrically coupled to said first end of said relay coil, wherein a disconnect signal is generated in accordance with a comparison of said time-out signal and said second voltage reference signal.

18. The ground fault circuit interrupter system defined by claim 17, further including a second surge suppressor interposed between said amplifier means and said integrator.

19. The ground fault circuit interrupter system defined by claim 17, wherein said first and said second surge suppressors comprise metal oxide varistors.

20. A surge suppresser disconnect protection system circuit for protecting a first surge suppressor from overvoltages, said first surge suppressor electrically coupled to phase and neutral terminals of an AC source, comprising:
- a relay switch including a relay contact and relay drive coil each having first and second ends, wherein said relay contact is settable to one of a high and a low impedance state in accordance with an interrupt signal provided across said coil and wherein said contact is electrically coupled between said first surge suppressor and said AC source phase terminal;
- signal adjuster means including phase, neutral and DC ports, wherein said adjuster means phase port is electrically connected to said AC source phase terminal and said neutral port is electrically connected to said AC source neutral terminal for rectifying AC to generate a DC signal, filtering and scaling said DC signal;
- an amplifier including a non-inverting input port, an inverting input port and an amplifier output port, said non-inverting input port electrically coupled to said adjuster means DC port, said inverting input port coupled to a first voltage reference and to said amplifier output port to form a feedback path such that a difference signal substantially equal to a difference between a first reference signal and said DC signal is generated and provided at said amplifier output port;

an integrator electrically coupled to said amplifier output port for generating a timer signal which is proportional to said difference signal and a time duration for which said difference signal is present; and a comparator electrically connected to said integrator and to a second reference signal for detecting a difference therebetween and generating said interrupt signal when said difference drops to around zero.

21. The surge suppressor disconnect protection circuit defined by claim 20, wherein said first surge suppressor is an MOV device.

* * * * *